United States Patent Office 3,440,033
Patented Apr. 22, 1969

3,440,033
METHOD FOR PRODUCING GRANULAR
PRODUCT
Srini Vasan, Glencoe, Ill., assignor to International
Minerals & Chemical Corporation, a corporation
of New York
No Drawing. Filed June 25, 1964, Ser. No. 378,064
Int. Cl. C05d 1/02
U.S. Cl. 71—28                                    11 Claims

ABSTRACT OF THE DISCLOSURE

Potash pellets are prepared by establishing a particulate mixture consisting essentially of water-soluble crystalline potash salts having a water content of about 5 to 13% by weight, extruding the crystalline salts while they are at a temperature of 50° to 180° F. through a restricted path having a diameter of from about 0.07 to about 0.25 inch, and severing the extruded salts to provide a cylindrical pellet having a length of about 1 to 10 times the diameter thereof. The restricted path is preferably characterized by a first conical section of decreasing cross-section, a second cylindrical section and a third conical section of increasing cross-section.

---

This invention relates to improved techniques for the production of a granular product, and to an improved granular product. The invention particularly relates to an extrusion process for converting finely divided water-soluble crystalline potash salts into a granular product of convenient size and physical characteristics.

In the conventional production of fertilizer materials, such as potassium sulfate and potassium chloride, the fine particules inherent in the usual methods of production are extremely objectionable. The fine materials cause serious dust problems in storage, handling and application, with resultant loss of material and contamination of the atmosphere, and also aggravate caking problems by increasing the hygroscopicity of the material and by providing particles of undesirable geometry. Numerous granulating processes have been proposed and employed to convert such fines into the more desirable granular product. Serious difficulty has been encountered with such processes, however, and no entirely satisfactory process has as yet been defined.

The use of various binders for the production of granular products has been suggested. The use of such binders has not met with great success or acceptance because when employed in an amount sufficient to provide a product having enough strength to permit further processing, such as drying, without excessive degradation, the amount of binder required has been so large as to substantially contaminate the product. In some instances, where the fine product itself does not greatly exceed commercial standards of purity, the use of a binder may render the granular product unacceptable in the trade. On the other hand, the use of volatile agents or binders, such as water for agglomeration has resulted in the formation of a product of undesirably low strength which degrades excessively in subsequent processing, such as drying. Thus, recycle rates become excessively high and the economics of the entire operation are adversely affected.

It is an object of this invention to provide an improved process whereby potash salts an be formed into pellets of suitable size which display outstanding strength and very low degradation in subsequent processing or handling.

It is another object of this invention to provide a process for the manufacture of pelletized potash salts in which water is used in the pelletizing process.

The present invention contemplates the method of preparing a potash pellet which comprises establishing a particulate mixture consisting essentially of water-soluble crystalline potash salts having a water content of from about 5% to about 13% by weight at a temperature of from about 50° F. to about 180° F. and extruding such crystalline solids through a restricted path having a diameter of from about 0.07 to about 0.25 inch and severing said extruded solids to provide a cylindrical pellet having a length of from about 1 to about 10 times the diameter thereof.

The process of this invention provides pellets having good non-dusting characteristics. Moreover, the process of this invention tends to maintain recycle rates at a minimum and thereby prolong the life of the extrusion equipment as well as enhance the operating economy of the operation. The cylindrical configuration of the product also minimizes the tendency of particles to agglomerate.

The process of the invention is applicable generically to water-soluble crystalline potash salts. Such materials include potassium chloride, potassium sulfate and the double sulfate of potassium and magnesium or langbeinite. It will be apparent that mixtures of these materials also can be employed. These materials are often employed as fertilizer ingredients.

Broadly the process of this invention contemplates adjusting the moisture content of the potash salts to from about 5 to about 13% by weight and extruding the particulate solids while at a temperature of from about 50° F. to about 180° F. and preferably from about 70° F. to about 140° F. The particulate solids, desirably less than −14 mesh size, are extruded through a cylindrical opening having a diameter of from about 0.07 to about 0.25 inch and the extruded material is severed to provide cylindrical pellets having a length of from about 1 to about 10 times and preferably from about 1 to about 3 times the diameter thereof. Ideally the extrusion path or die cross-section comprises a conical path of decreasing cross-section leading to a cylindrical opening which in turn leads to a conical path of increasing cross-section. Such path is more particularly defined hereinafter. Following extrusion, the pellets may be dried at elevated temperatures if desired.

In carrying out one embodiment of the process of this invention, water-soluble crystalline particulate potash salts, which preferably are −14 mesh in size, are first adjusted to a moisture content to provide optimum pellet strength and operating characteristics. It has been found that the moisture content of the feed salts to the extrusion operation has a dramatic effect upon the throughput rate and the degradation characteristics of the pellets. Optimum strength for potassium sulfate salts, e.g., potassium sulfate and the double sulfate of potassium and magnesium, is obtained with water contents in the range of from about 5 to about 8%. Optimum strength for potassium chloride is obtained with water contents in the range of from about 8 to about 13%. Mixtures of potassium sulfate salts and potassium chloride salts will have an optimum water content somewhere between the optimums for each ingredient.

The water content of the water-soluble potash salts may be adjusted, for example, by drying a wet filter cake having a moisture content is excess of the desired moisture in a rotary drier. On the other hand, substantially dry particulate potash salts may be moistened by admixture with water in a suitable mixing vessel, such as a pug mill. Alternatively, a wet filter cake or the like may be admixed with recycle drier fines or the like in a pug mill to produce a feed material having the desired moisture content. While the salts may be moistened with water, it is also possible to moisten with water containing the dissolved potash salt.

It has also been determined that the temperature of the feed material prior to extrusion is important to successful formation of a pelletized product. Temperature of the feed can be adjusted in a conventional kiln or cooler. Water-soluble crystalline potash salts successfully can be processed at temperatures within the range of from about 50° to about 180° F. and more preferably within the range of from about 70° to about 140° F. At higher temperatures the pellets tend to disintegrate as quickly as they are formed. The percentage of material actually pelletized tends to increase as the temperature decreases from 180° to about 90° F.

As indicated earlier, the particulate material desirably is about −14 mesh. Particulate material of −100 mesh is most appropriate for the practice of this invention. Indeed, material as small as −300 mesh can be employed.

The path of the material as extruded, i.e., the shape of the die opening through which it passes, also has a bearing upon the production of granular product. In accordance with one preferred aspect of this invention, the material to be pelletized is first passed under pressure along a lead-in section defining a confined, conical path of decreasing cross-section. This decreasing cross-section is desirably defined by an apical cone angle in the range of from about 10 to about 50 degrees and preferably from about 15 to about 40 degrees. The material is then forced along a cylindrical path having a diameter substantially defining the diameter of the pellet to be produced, and, of course, also coinciding with the smaller diameter of the conical lead-in section. The length of the extrusion path is desirably in the range of from about 1 to about 10 times the diameter thereof. The extruded rod then desirably enters a diverging conical path having an apical angle in the range of from about 3 to about 30 degrees and preferably from about 8 to about 20 degrees.

The ratio of total axial length of the lead-in section plus the cylindrical portion of the die opening to the diameter of the cylindrical portion also has a bearing upon the successful formation of pellets. This ratio can be varied between about 1.5:1 and about 6:1, the lower ratios being more suitable for materials of lower moisture content, and higher ratios being preferred for use with materials of higher moisture content. For example, ratios of about 2:1 are more suitable for materials containing about 6% moisture, while ratios of about 4:1 are preferred for materials containing about 8 to about 10% moisture.

It will be understood that the aforedescribed ratio of length to diameter has a bearing upon the temperature reached in the extrusion operation and upon the quantity of moisture flashed from the feed. Higher temperatures are reached and greater quantities of moisture flashed, in some cases as much as 1.5% by weight of the feed, at ratios approaching 6:1.

The pressure exerted on the material during extrusion is in part a function of the "flowability" or "extrudability" of the material. Pressures, generally, are rather low ranging from about 5 to about 200 p.s.i. and often from about 20 to about 80 p.s.i.

If desired, the pellets can be dried at elevated temperatures. The temperature to be employed is within the skill of the routineer but generally is above 212° F. Often drying is conducted in the range of from about 300 to about 600° F. Drying will increase the grade of the product by removing moisture and may also increase the strength of the pellet.

It is believed that the excellent results obtained in the pelletizing of water-soluble crystalline potash salts is due in part to the generation of heat in the extrusion operation, which results in the flashing of a portion of the moisture content of the feed and a precipitation of dissolved material at the crystalline interfaces, resulting in the formation of a cement-like bond between the compressed crystal surfaces. Such phenomenon could be termed flash bonding. It is further believed that with salts containing some magnesium chloride such as fertilizer grade potassium sulfate, a hydrolysis reaction may occur which results in the formation of magnesium oxychloride between crystal surfaces. The magnesium oxychloride, present only in trace amounts, is believed to act as a cement and substantially enhances the strength of the product pellets. Potassium sulfate, and particularly fertilizer grade potassium sulfate, are preferred materials for the practice of this invention.

In another embodiment of this invention water-soluble crystalline potash salts are extruded under the above defined conditions in admixture with a small amount of urea. The urea is desirably employed in amounts of from about 0.2 to about 2% by weight of the mixture. Urea appears to act as a lubricant; such phenomenon being observed even when urea is present in amounts as small as about 0.2%. Because of its lubrication ability, minor amounts of urea increase the rate of extrusion, reduce power requirements and reduces wear even further. The use of urea with langbeinite is particularly preferred for the practice of this invention. Urea, of course, is an ingredient of many fertilizer and animal feed ingredients and, therefore, is not a contaminant when the potash salts are employed for these purposes.

Machines for carrying out such an extrusion-pelletizing procedure are known, but such machines have not heretofore successfully and commercially been employed in the pelletizing of water-soluble crystalline potash salts. Exemplary of the commercially-available machines suitable for carrying out the process of this invention is the Ace Pellet Mill manufactured by Sprout-Waldron Company. Such machines do not of themselves form a part of the instant invention, and accordingly they will not be described in detail. It will be mentioned that the pellet mill comprises a rotary drum having a peripheral wall which is provided with a plurality of radially-extending openings which define the path through which the material is extruded. Feed material is introduced to the interior of the drum, and a plurality of rollers are provided adjacent to the internal surface of the drum to distribute the feed material within the rotating drum and to assist in the extrusion of the material through the openings. Means are sometimes provided externally of the drum for breaking the spaghetti-like extruded product into pellets of suitable length. Most often, the length to diameter ratio of the exruded pellet is controlled by varying the rotational speed of the die and/or the geometry of the die, and/or the rate of feed. The feed rates, roll settings and the like are within the skill of the art.

The following examples are included for illustrative purposes only and in no way are intended to limit the scope of this nivention.

The pelletizing machine employed in the following examples was an Ace Pellet Mill manufactured by Sprout-Waldron Company. The pellet mill was equipped with a rotating cylinder 16½" I.D. having approximately 3200 die holes. Two 8⅛" diameter friction driven rolls were positioned inside the cylinder to apply pressure to the particulate feed which was introduced into the inside of the rotating cylinder.

EXAMPLE I

The pellet mill cylinder for this example was driven at 316 r.p.m. and had the following die characteristics: throat diameter—⅛"; length of inlet taper—3/32"; length of throat—5/32"; length of discharge taper—½"; inlet taper—20°; and discharge taper—6°.

Potassium sulfate at the rate of 8.0 tons per hour, having a moisture content of 6.2%, and a temperature of 121° F. was fed to the pellet mill. The feed was substantially —14 mesh and had the following screen analysis:

| Mesh: | Percent |
| --- | --- |
| +20 | 14 |
| +35 | 28 |
| +48 | 39 |
| +65 | 53 |
| +100 | 66 |
| +200 | 88 |
| —200 | 12 |

The extruded product was severed into short cylindrical segments and was characterized by a moisture content of 5.1% and a temperature of 143° F. The product had the following screen analysis:

| Mesh: | Percent |
| --- | --- |
| +8 | 54 |
| +14 | 70 |
| +28 | 83 |
| +65 | 94 |
| —65 | 6 |

The +8 mesh fraction represented essentially intact pellets. The —8 mesh fraction can be recycled with regrinding if desired or the —8 mesh +65 mesh fraction can be utilized as a granulated product. The pellets formed were characterized by good strength.

The pellets were further processed by drying to a pellet temperature of 265° F. and a moisture content of 0.4%. The dried pellets were also characterized by good strength and non-dusting qualities.

EXAMPLE II

The pellet mill cylinder for this example was driven at 316 r.p.m. and had the following die characteristics: throat diameter—1/8"; length of inlet taper—3/32"; length of throat—13/32"; length of discharge taper—3/8"; inlet taper—20°; and discharge taper—6°.

Potassium sulfate at the rate of 4.4 tons per hour, having a moisture content of 5.7%, and a temperature of 83° F. was fed to the pellet mill. The feed was substantially —14 mesh and had the following screen analysis:

| Mesh: | Percent |
| --- | --- |
| +20 | 4 |
| +35 | 12 |
| +48 | 21 |
| +65 | 38 |
| +100 | 55 |
| +200 | 85 |
| —200 | 15 |

The extruded product was severed into short cylindrical segments and was characterized by a moisture content of 5.4% and a temperature of 139° F. The product had the following screen analysis:

| Mesh: | Percent |
| --- | --- |
| +8 | 69 |
| +14 | 80 |
| +28 | 89 |
| +65 | 96 |
| —65 | 4 |

The +8 mesh fraction represented essentially intact pellets. The —8 mesh fraction can be recycled with regrinding if desired or the —8 mesh +65 mesh fraction can be utilized as a granulated product. The pellets formed were characterized by good strength.

The pellets were further processed by drying to a pellet temperature of 250° F. and a moisture content of 0.3%. The dried pellets were also characterized by good strength and non-dusting qualities.

EXAMPLE III

The pellet mill cylinder for this example was driven at 316 r.p.m. and had the following die characteristics: throat diameter—1/8"; length of inlet taper—3/32"; length of throat—5/32"; length of discharge taper—1/2"; inlet taper—20°; and discharge taper—8°.

Potassium sulfate at the rate of 5.2 tons per hour, having a moisture content of 7.0%, and a temperature of 88° F. was fed to the pellet mill. The feed was substantially —14 mesh and had the following screen analysis:

| Mesh: | Percent |
| --- | --- |
| +20 | 12 |
| +35 | 18 |
| +48 | 25 |
| +65 | 38 |
| +100 | 54 |
| +200 | 83 |
| —200 | 17 |

The extruded product was severed into short cylindrical segments and was characterized by a moisture content of 6.9% and a temperature of 106° F. The product had the following screen analysis:

| Mesh: | Percent |
| --- | --- |
| +8 | 66 |
| +14 | 78 |
| +28 | 88 |
| +65 | 96 |
| —65 | 4 |

The +8 mesh fraction represented essentially intact pellets. The —8 mesh fraction can be recycled with regrinding if desired or the —8 mesh +65 mesh fraction can be utilized as a granulated product. The pellets formed were characterized by good strength.

The pellets were further processed by drying to a pellet temperature of 525° F. and a moisture content of 0.06%. The dried pellets were also characterized by good strength and non-dusting qualities.

EXAMPLE IV

The pellet mill cylinder for this example was driven at 320 r.p.m. and had the following die characteristics; throat diameter—1/8"; length of inlet taper—3/32"; length of throat—5/32"; length of discharge taper—1/2"; inlet taper—20°; and discharge taper—6°.

Potassium chloride at the rate of 2.4 tons per hour, having a moisture content of 11.0%, and a temperature of 66° F. was fed to the pellet mill. The feed was substantially —14 mesh and had the following screen analysis:

| Mesh: | Percent |
| --- | --- |
| +20 | 15 |
| +35 | 72 |
| +48 | 84 |
| +65 | 91 |
| +100 | 95 |
| +200 | 99 |
| —200 | 1 |

The extruded product was severed into short cylindrical segments and was characterized by a moisture content of 9.0% and a temperature of 118° F. The product had the following screen analysis:

| Mesh: | Percent |
| --- | --- |
| +8 | 80 |
| +14 | 89 |
| +28 | 95 |
| +65 | 97.4 |
| —65 | 2.6 |

The +8 mesh fraction represented essentially intact pellets. The —8 mesh fraction can be recycled with regrinding if desired or the —8 mesh +65 mesh fraction can be utilized as a granulated product. The pellets formed were characterized by good strength.

The pellets were further processed by drying to a pellet temperature of 295° F. and a moisture content of 0.7%. The dried pellets were also characterized by good strength and non-dusting qualities.

Since modifications of this invention will be apparent to those skilled in the art, it is intended that this invention be limited only by the scope of the appended claims.

I claim.

1. The method of preparing a potash pellet which comprises providing a particulate mixture consisting essentially of water-soluble crystalline potash salts having a water content of from about 5% to about 13% by weight at a temperature of from about 50° to about 180° F. and extruding said mixture through a die opening having a minimum diameter of from about 0.07 to about 0.25 inch and severing said extruded solids to provide a cylindrical pellet having a length of from about 1 to about 10 times the diameter thereof.

2. The method of claim 1 wherein the temperature of said mixture is in the range of from about 70° F. to about 140° F. and the cylindrical pellet is characterized by a length of from about 1 to about 3 times the diameter thereof.

3. The method of claim 1 wherein the die opening is characterized by a first conical section of decreasing cross-section, a second cylindrical section and a third conical section of increasing cross-section.

4. The method of preparing a potash pellet which comprises providing a particulate mixture consisting essentially of potassium sulfate having a water content of from about 5% to about 8% by weight at a temperature of from about 50° F. to 180° F. and extruding said mixture through a die opening having a minimum diameter of from about 0.07 to about 0.25 inch and severing said extruded solids to provide a cylindrical pellet having a length of from about 1 to about 10 times the diameter thereof.

5. The method of claim 4 wherein the temperature of said mixture is in the range of from about 70° F. to about 140° F. and the cylindrical pellet is characterized by a length of from about 1 to about 3 times the diameter thereof.

6. The method of preparing a potash pellet which comprises providing a particulate mixture consisting essentially of potassium sulfate having a water content of from about 5% to about 8% by weight at a temperature of from about 70° F. to about 140° F.; extruding said mixture through a die opening characterized by a first conical section of decreasing cross-section having an apical cone angle of from about 10 to about 50 degrees, a second cylindrical section section having a diameter of from about 0.07 to about 0.25 inch and a third conical section of increasing cross-section having an apical cone angle of from about 3 to about 30 degrees; and severing said extruded solids to provide a cylindrical pellet having a length of from about 1 to about 3 times the diameter thereof.

7. The method of preparing a potash pellet which comprises providing a particulate mixture consisting essentially of potassium chloride having a water content of from about 8% to about 13% be weight at a temperature of from about 50° F. to about 180° F. and extruding said mixture through a die opening having a minimum diameter of from about 0.07 to about 0.25 inch and severing said extruded solids to provide a cylindrical pellet having a length of from about 1 to about 10 times the diameter thereof.

8. The method of claim 7 wherein the temperature of said mixture is in the range of from about 70° F. to about 140° F. and the cylindrical pellet is characterized by a length of from about 1 to about 3 times the diameter thereof.

9. The method of preparing a potash pellet which comprises providing a particulate mixture consisting essentially of potassium chloride having a water content of from about 8% to about 13% by weight at a temperature of from about 70° F. to about 140° F.; extruding said mixture through a die opening characterized by a first conical section of decreasing cross-section having an apical cone angle of from about 10 to about 50 degrees, a second cylindrical section having a diameter of from about 0.07 to about 0.25 inch and a third conical section of increasing cross-section having an apical cone angle of from about 3 to about 30 degrees; and serving said extruded solids to provide a cylindrical pellet having a length of from 1 to about 3 times the diameter thereof.

10. The method of preparing a potash pellet which comprises providing a particulate mixture consisting essentially of water-soluble crystalline potash salts and a minor amount of urea, said mixture having a water content of from about 5% to about 13% by weight and being at a temperature of from about 50° F. to about 180° F., extruding said mixture through a die opening having a minimum diameter of from about 0.07 to about 0.25 inch, and serving said extruded solids to provide a cylindrical pellet having a length of from about 1 to about 10 times the diameter thereof.

11. The method of preparing a potash pellet which comprises providing a particulate mixture consisting essentially of langebinite and from about 0.2 to about 2% by weight of urea, said mixture having a water content of from about 5% to about 8% by weight and being at a temperature of from about 70° F. to about 140° F.; extruding said mixture through a die opening characterized by a first conical section of decreasing cross-section, a second cylindrical section having a diameter of from about 0.07 to about 0.25 inch and a third conical section of increasing cross-section; and severing said extruded solids to provide a cylindrical pellet having a length of from about 1 to about 3 times the diameter thereof.

References Cited

UNITED STATES PATENTS

| | | | |
|---|---|---|---|
| 2,117,808 | 5/1938 | Jones | 71—16 X |
| 2,935,387 | 5/1960 | Phillips | 24—313 |
| 3,189,433 | 6/1965 | Hollingsworth et al. | 71—37 |
| 3,269,824 | 8/1966 | Aswell | 71—64 |

FOREIGN PATENTS

| | | |
|---|---|---|
| 1,111,153 | 2/1962 | Germany. |
| 1,132,896 | 1/1963 | Germany. |

DONALL H. SYLVESTER, *Primary Examiner.*

R. D. BAJEFSKY, *Assistant Examiner.*

U.S. Cl. X.R.

23—89, 121, 313; 71—61, 63, 64